(12) United States Patent
Gruen

(10) Patent No.: US 11,797,869 B2
(45) Date of Patent: Oct. 24, 2023

(54) ARTIFICIAL INTELLIGENCE FACILITATION OF REPORT GENERATION, POPULATION AND INFORMATION PROMPTING

(71) Applicant: International Business Machines Corporation, Armonk, NY (US)

(72) Inventor: Daniel M. Gruen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 16/291,638

(22) Filed: Mar. 4, 2019

(65) Prior Publication Data

US 2020/0285981 A1  Sep. 10, 2020

(51) Int. Cl.
  *G06N 5/02* (2023.01)
  *G06N 20/10* (2019.01)
  *G06N 5/045* (2023.01)
  *G06Q 50/26* (2012.01)
  *G06N 20/00* (2019.01)

(52) U.S. Cl.
  CPC ............. *G06N 5/045* (2013.01); *G06N 20/00* (2019.01); *G06Q 50/26* (2013.01)

(58) Field of Classification Search
  CPC ......... G06N 5/045; G06N 20/00; G06Q 50/26
  USPC ....................................................... 706/1–62
  See application file for complete search history.

(56) References Cited

U.S. PATENT DOCUMENTS

| | | | |
|---|---|---|---|
| 8,739,059 B2 | 5/2014 | Rabenold et al. | |
| 9,990,337 B2 | 6/2018 | Birnbaum et al. | |
| 10,318,984 B1* | 6/2019 | Wai | G06N 20/00 |
| 2009/0083200 A1* | 3/2009 | Pollara | G06N 20/00 |
| | | | 706/14 |
| 2011/0099006 A1 | 4/2011 | Sundararaman et al. | |
| 2013/0218805 A1* | 8/2013 | Mao | G06Q 30/0201 |
| | | | 705/36 R |

(Continued)

OTHER PUBLICATIONS

Mel, et al., The NIST Definition of Cloud Computing, National Institute of Standards and Technology Special Publication 800-145, Sep. 2011, 7 Pages.

*Primary Examiner* — Brandon S Cole

(74) *Attorney, Agent, or Firm* — Amin, Turocy & Watson, LLP

(57) ABSTRACT

Systems and computer-implemented methods facilitating automatic report generation, population and information prompting employing artificial intelligence technology are provided. For example, a computer-implemented method can include: identifying relevant sections or options of an automatically generated report, wherein the identifying is based on a defined factor and employs artificial intelligence; generating narrative information comprising at least one of a reference to a decision-making process, one or more alternatives evaluated, a reasoning process or information indicating a basis upon which at least one of one or more sections or options were included in or excluded from the report; outputting decision information indicating the basis for decisions selected to populate one or more relevant sections of the report; prompting for information including decision bases where not known or predicted by the decision making process, and using such information for the generated report and to improve the decision making and narrative generation processes.

20 Claims, 10 Drawing Sheets

(56) References Cited

U.S. PATENT DOCUMENTS

| | | | |
|---|---|---|---|
| 2016/0098480 A1* | 4/2016 | Nowson | G06F 40/30 |
| | | | 707/738 |
| 2016/0098800 A1* | 4/2016 | Atwell | G06Q 40/08 |
| | | | 705/4 |
| 2016/0314111 A1* | 10/2016 | Fougner | H04L 51/046 |
| 2017/0162202 A1 | 6/2017 | Formhals et al. | |
| 2017/0178135 A1* | 6/2017 | Bull | G06Q 20/40 |
| 2017/0186099 A1* | 6/2017 | Lubczynski | G06Q 40/123 |
| 2018/0096267 A1* | 4/2018 | Masekera | G06Q 10/06 |
| 2019/0158666 A1* | 5/2019 | St-Cyr | G06Q 30/01 |
| 2019/0188326 A1* | 6/2019 | Daianu | G06F 9/453 |
| 2019/0236680 A1* | 8/2019 | Kounine | G06Q 30/0633 |
| 2020/0285981 A1* | 9/2020 | Gruen | G06N 5/045 |
| 2021/0279425 A1* | 9/2021 | Horowitz | G06N 3/08 |

* cited by examiner

ARTIFICIAL INTELLIGENCE FACILITATION OF REPORT GENERATION, POPULATION AND INFORMATION PROMPTING

BACKGROUND

One or more embodiments relate artificial intelligence, and more specifically, to artificial intelligence facilitation of report generation, population and information prompting.

SUMMARY

The following presents a summary to provide a basic understanding of one or more embodiments. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program devices that can autonomously generate reports and predict information to include in generated reports using artificial intelligence technology are described.

According to an embodiment, a system is provided. The system comprises a memory that stores computer executable components; and a processor that executes the computer executable components stored in the memory. The computer executable components comprise: a generating component that: generates narrative information comprising at least one of a reference to a decision-making process, one or more alternatives evaluated, a reasoning process or information indicative of a basis upon which at least one of one or more options or one or more sections were included in or excluded from the report; and identifies at least one of one or more relevant sections or one or more relevant options of an automatically generated report, wherein the identification is based on a defined factor and employs artificial intelligence, and wherein the generation employs artificial intelligence. The system also comprises a populating component that: determines the narrative information to include in the report, wherein the determining the narrative information to include comprises at least determining at least one location in the one or more sections to include one or more rationales for at least one decision, and outputs decision information identifying a basis for inclusion or exclusion of report information selected to populate the at least one of one or more relevant sections or one or more relevant options of the report, wherein the output is based on the narrative information.

In another embodiment, a computer-implemented method is provided. The computer-implemented method comprises: identifying, by a system operatively coupled to a processor, at least one of one or more relevant sections or one or more relevant options of an automatically generated report, wherein the identifying is based on a defined factor and employs artificial intelligence; generating, by the system, narrative information comprising at least one of a reference to a decision-making process, one or more alternatives evaluated, a reasoning process or information indicative of a basis upon which at least one of one or more sections or one or more options were included in or excluded from the report, wherein the generating is employing artificial intelligence; determining, by the system, the narrative information to include in the automatically generated report, wherein the determining the narrative information to include comprises at least determining at least one location in the one or more sections to include one or more rationales for at least one decision; and outputting, by the system, decision information identifying a basis for inclusion or exclusion of report information selected to populate the at least one of one or more relevant sections or one or more relevant options of the report, wherein the outputting is based on at least the narrative information.

In another embodiment, a computer program product facilitating artificial intelligence-generated and populated reports is provided. The computer program product comprises a computer readable storage medium having program instructions embodied therewith, the program instructions executable by a processor to cause the processor to: identify, by the processor, at least one of one or more relevant sections or one or more relevant options of an automatically generated report, wherein the identification is based on a defined factor and employs artificial intelligence; generate, by the processor, narrative information comprising at least one of a reference to a decision-making process, one or more alternatives evaluated, a reasoning process or information indicative of a basis upon which at least one of one or more sections or one or more options were included in or excluded from the report, wherein the generation employs artificial intelligence; determine, by the processor, the narrative information to include in the report, wherein the determination of the narrative information to include comprises at least a determination of at least one location in the one or more sections to include one or more rationales for at least one decision; and output, by the processor, decision information identifying a basis for inclusion or exclusion of report information selected to populate the at least one of one or more relevant sections or one or more relevant options of the report, wherein the outputting is based on at least the narrative information.

According to an embodiment, a system is provided. The system can include a memory that stores computer executable components. The system can also include a processor, operably coupled to the memory, and that can execute the computer executable components stored in the memory. The computer executable components can include: a generating component, a populating component, a prompting component and/or a training component.

In various embodiments, the computer-implemented method can comprise: automatically generating a basic report using a template or schema, wherein relevant sections are selected based on a situation, an audience, and/or a filing need; populating the report with information from the system and/or a record of decisions made; generating a narrative that includes a reference to a decision making process, alternatives evaluated, factors considered, a reasoning process, and/or why options were included or rejected; describing an ultimate decision and/or a reason why a section, an option, a decision, and/or a template was selected; and conversationally prompting an entity for information the system does not have or cannot infer (e.g., why was section/option/decision/template X selected/rejected? what other sections/options/decisions/templates were considered?), wherein the prompting is performed to obtain information needed for a particular report and/or to obtain training data to improve an internal model of the system, wherein the internal model lacks certain information and/or the model would predict sections/options/decisions/templates other than those that were selected, wherein the internal model can use the obtained information in the generation of other reports (e.g., is a client based in company X always rejected? is a destination where there is no rain predicted always selected?), and wherein entities can indicate and dictate information that should be added to the report, yielding information for the system on what makes a well-formed report. In various embodiments, as used herein, the term "entity" can include, but is not limited to, a machine, computer, device, human or otherwise.

DETAILED DESCRIPTION

Figure 1:
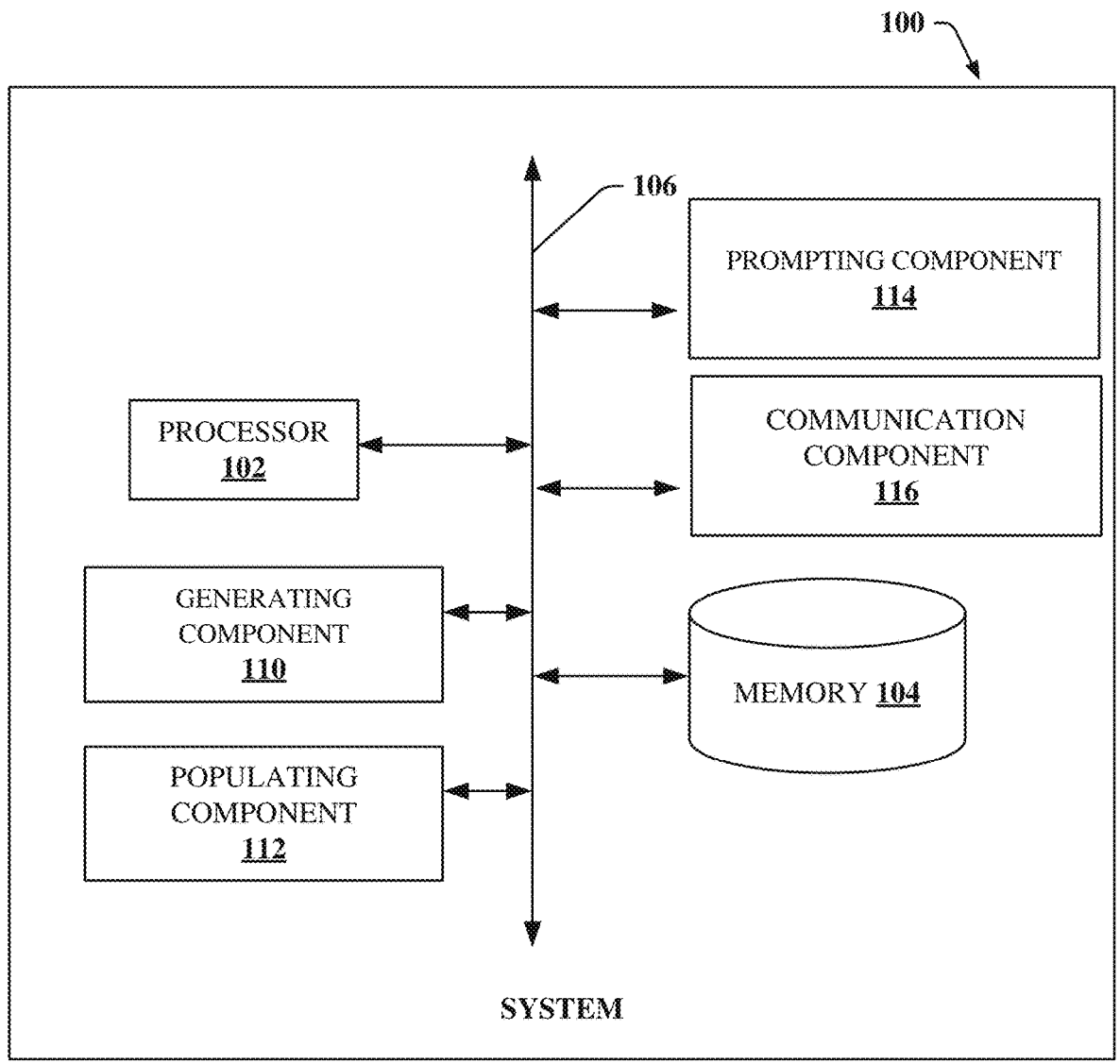
FIG. 1 shows a block diagram of an example, non-limiting system that provides artificial intelligence (AI)-produced reports in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments described herein, the terms "class," "classification," "predict," or "prediction" can be used interchangeably herein, unless specified otherwise. The terms "artificial intelligence" or "AI" can refer to intelligence demonstrated by machines, in contrast to the natural intelligence displayed by humans. In some embodiments described herein, AI technology can be used in real-life and/or simulated situations to increase the accuracy and consistency of generated reports. However, incomplete training data used to train the AI systems can result in such systems producing inaccurate or inconsistent reports. Accordingly, AI systems that can, based on information already known by the AI systems, information generated by the AI system, information input into the AI systems by an entity, and/or information input into the AI systems by an entity after being prompted for such information by the AI systems (e.g., via conversational questioning, where the AI system asks at least one entity for further information after determining that a generated report is potentially missing relevant information), predict the information that should populate a given report are desirable. Such predictions can increase the level of accuracy and consistency of generated reports.

In some embodiments, one or more components herein can employ a probabilistic and/or statistical-based analysis to learn and/or generate inferences with respect to reports or prediction of information to include in reports. For example, one or more embodiments can utilize AI or inference-based schemes to facilitate learning and/or generating inferences. One or more components employed herein can employ any suitable machine-learning based techniques, statistical-based techniques and/or probabilistic-based techniques. For example, one or more components can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In some embodiments described herein, one or more components can perform a set of machine learning computations associated with report generation and/or determination of or prediction of information for the report. For example, one or more components can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Reliable report generation that is both accurate and consistent is desirable. An AI system can populate a report template with information for a given situation based on information already known by the AI system, based on information input into the system by an entity, based on information input into the system by an entity after the AI system has prompted the entity for the information, and/or based on any combination of the preceding.

In some embodiments described herein, an AI system can populate a report for a given situation with information known by the system prior to the generation of the report. The AI system can have sufficient information to complete the report and generate the report. In some embodiments, AI systems can have insufficient information to complete a given report, but the AI systems can predict the necessary information to complete the report, as described herein. In some embodiments, the populated report can comprise a basic form.

One approach to enabling an AI system to predict information necessary to compete a given report is to provide the AI system with training data that allows the AI system to learn the types of information that should be entered in certain reports when certain circumstances exist or when certain conditions are met. Such an approach can allow entities of the AI system to foresee probable situations where the AI system could benefit from knowing such information.

In various embodiments, one or more embodiments describes systems, methods, and apparatuses for populating and generating reports based on information known by an AI system. Information known by the AI system can be learned by the AI system from input by an entity. The entity input can be entered after prompting from the AI system or without prompting from the AI system. In some embodiments, the information used to populate and generate the report can be predicted by the AI system based on any number of information sources and/or approaches including, but not limited to, known information from similar prior reports, training data supplied by an entity, or a logical interpretation of the information known by the AI system that is applied to the generated report. One or more embodiments describe ways to train the AI system by demonstrating valid information in the training data and how to employ this training to generate more consistent and accurate reports. This can thereby avoid or minimize the difficulties with trying to understand the details of a particular AI model, the system it is a part of, and the difficulties with mapping this understanding to a given complexity level and domain a human can understand. In some embodiments, the entity can comprise a person or a group of people.

In particular, one or more embodiments describe a system that can operate in two modes, a training mode and an application mode. In the training mode, the system can receive as input, a training dataset including feature vectors in addition to classifications and information corresponding to the feature vectors. The information can be provided by a subject matter expert. The system can further combine the classifications and information to produce augmented labels. Further, the system generates another updated training dataset that includes the feature vectors and the augmented labels. In the application mode, the system can use a classifier, trained on the updated training dataset, to analyse real world (non-training) feature vectors and thereby generate corresponding real world augmented labels. Further, the system can decompose the real world augmented labels, using the classifier, to generate classifications and information for real world feature vectors. In this way, the system can populate and generate reports with real world classifications of given feature vectors.

In some embodiments described herein, the systems, methods, and apparatuses described herein can be independent of the machine-learning classification algorithm; any supervised learning classification algorithm can be used, including neural networks, which makes this technique widely deployable. For example, multiclass machine-learning algorithms that can be used include, but are not limited to, a support vector machine learning algorithm, a nearest-neighbor machine-learning algorithm, a deep-learning algorithm, an extreme classification algorithm, a recursive leaning algorithm, a hierarchical learning algorithm, a random forest algorithm, and the like.

In some embodiments, the systems, methods, and apparatus can be relatively simple to implement from a coding and computational perspective, thereby reducing the likelihood of generating computational computer bugs, which can hinder implementation.

In another aspect, the systems, methods, and apparatus can educate end-entities of the generated reports. One or more embodiments can enable ways to set expectations for what kind of predictions the AI systems can realistically provide (e.g., via conversational debriefing between at least one entity and the AI system, where the AI system provides the at least one entity with the details of how and why the AI system made a prediction). Other embodiments can enable ways to improve the ability of the AI systems to predict information that should be included in a given report (e.g., the AI systems recognize a human decision that is atypical and does not match that which the system would have predicted). Accordingly, different expectation levels can be set for the end-entities of the reports regarding the AI system ability to predict information that should be included in a given report. Setting report end-entity expectations correctly for AI systems can improve satisfaction with the systems.

FIG. 1 illustrates a block diagram of an example, non-limiting system 100 for AI-populated and generated reports in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a generating component 110, populating component 112, and a prompting component 114. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication component 116 which enables communication between the system, components, models, devices, etc. over one or more networks.

As mentioned, an AI system can generate a report. Accordingly, the generating component 110 can generate a report from a template or schema. In some embodiments the template or schema exists on a database of templates/schemas. The database can optionally exist on the AI system or optionally exist on an external system accessible by the AI system via a network. In other embodiments, the AI system can receive the template or schema from an entity.

In some embodiments, the generating component 110 can be configured to generate a report with at least one section and/or at least one option. For example, a report for a medical examination can include a section for a medical history of a patient. In some embodiments, inclusion of the at least one section and/or at least one option in the generated report is based on the audience of the report, a situation that preceded generation of the report, and/or on some compulsory input to the report.

In some embodiments described herein, the populating component 112 can populate the at least one section and/or at least one option of the generated report with information. In some embodiments the information with which the system 100 populates the report is information known by the system 100 prior to generating the report. In other embodiments, the information with which the system 100 populates the report is information received from an entity.

In some embodiments described herein, the prompting component 114 can prompt the entity to input additional information not known by the system 100 to generate a complete report (e.g., via conversational questioning, where the AI system asks at least one entity for further information after determining that a generated report is potentially missing relevant information). In some embodiments, the information input by the entity, in response to the prompting from the system 100, can comprise training data that can be used by the system 100 to improve internal performance of the system 100, or to improve the system 100 ability to predict information to be included in future reports.

The various components (e.g. the generating component 110, the populating component 112, the prompting component 114, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, wireless fidelity (Wi-Fi), Wi-Max, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program devices can be employed to solve new problems that arise through advancements in technology, computer networks, the Internet and the like.

Embodiments of devices described herein can employ AI to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which they are granted access and can provide for reasoning about or determine states of the system, environment, etc. from a set of observations as captured via events and/or data. Determinations can be employed to identify a specific context or action, or can generate a probability distribution over states, for example. The determinations can be probabilistic (e.g., a computation of a probability distribution over states of interest based on a consideration of data and events). Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classifications, such as explicitly trained (e.g., via training data and/or conversational debriefing or conversational questioning with at least entity), as well as implicitly trained (e.g., via observing behavior, preferences, historical information, receiving extrinsic information, etc.) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such a classification can employ a probabilistic and/or statistical-based analysis to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
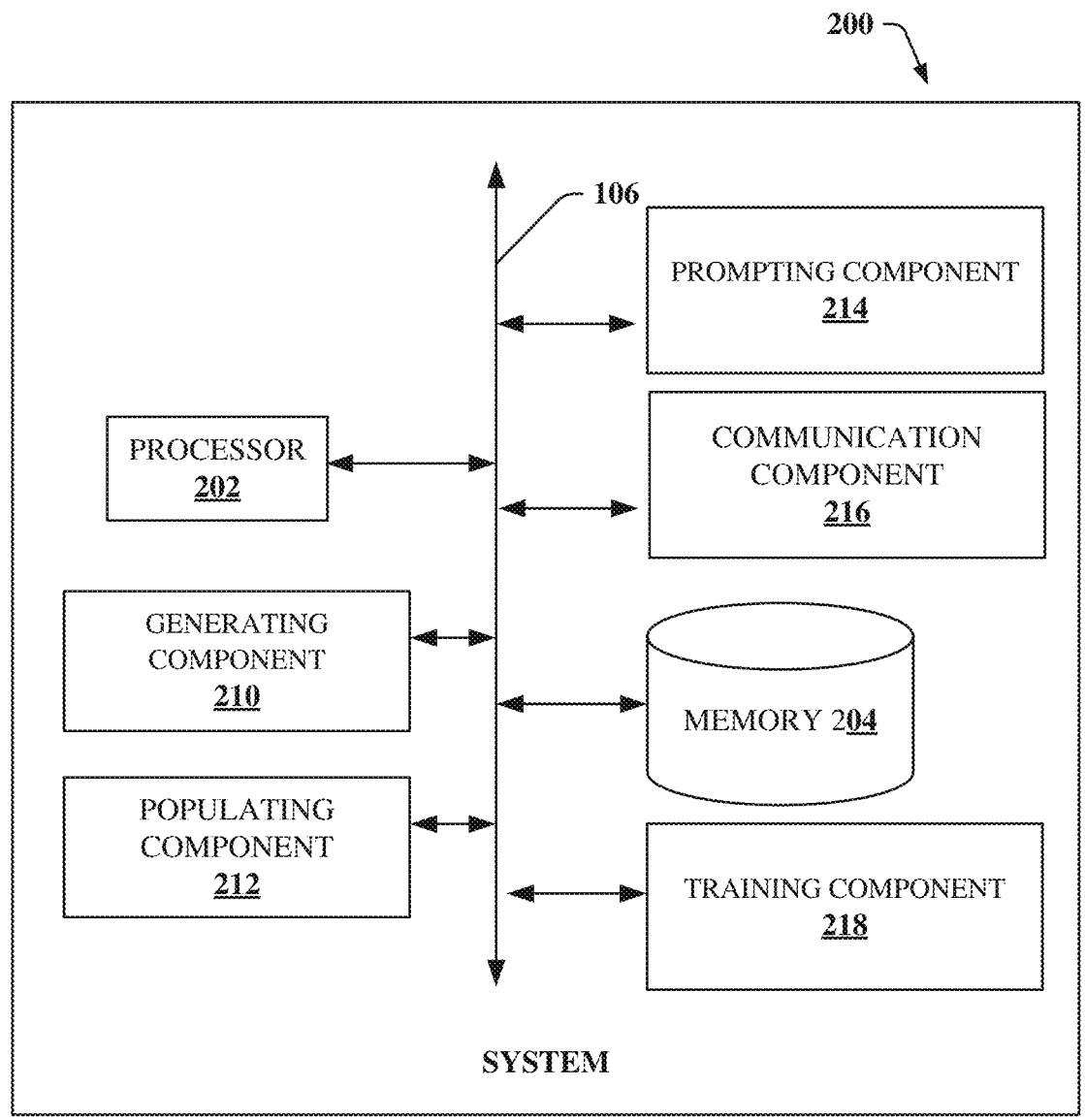
FIG. 2 shows a block diagram of another example, non-limiting system that provides AI-produced reports in accordance with one or more embodiments described herein.

FIG. 2 illustrates a block diagram of an example, non-limiting system 200 for AI-populated and generated reports in accordance with one or more embodiments described herein. Aspects of systems (e.g., system 200 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

In some embodiments described herein, a training component 218 can ask, during the training process, that a subject matter expert trains the system 100 on what constitutes a well-formed report (e.g., via conversational questioning, where the AI system asks at least one entity for further information regarding at least one type of report). In some embodiments, the training data can be used by the AI system to predict information that should be included in a given report. In other embodiments, the training data can be used to improve the AI system ability to predict information that should be included in a given report (e.g., the AI system recognizes a human decision that is atypical and does not match that which the system would have predicted).

In some embodiments, the system 100 can leverage existing machine classification technology in a straightforward way to generate, by the generating component 210 and/or the populating component 212, a classifier that predicts information to include in a given report along with corresponding classifications. In some embodiments, to create a supervised machine learning classifier, a set of training data can be provided to the training component 218, where the training data can have two components. The first component can include a set of one or more feature vectors, x, for a particular entity. Examples of such one or more feature vectors can include, but not be limited to, an image, video, audio, text, and the like. For example, for a report on a forensic analysis, information on the forensic analysis can be described in text format as a part of the one or more feature vectors. The second component can include a prediction and/or a classification, y, for the one or more feature vectors. Examples of such a prediction and/or classification can include, but not be limited to, a description or a summary of potential causes of an observed phenomenon.

In some embodiments, the input to the training component 218 can include a set of one or more training feature vectors x. Moreover, the input to the training component 218 can include classifier y which can include a set of correct classes for the one or more feature vectors x. Further, the input to the training component 218 can include a prediction z that correspond to the one or more feature vectors.

In some embodiments, the output of the generating component 210 and/or the populating component 212 can include the real feature vectors to classify, which can be referred to as $x_{real}$. Moreover, the output of the generating component 210 and/or the populating component 212 can include the report information classes for the one or more feature vectors, which can be referred to as $y_{predict}$. The output of the generating component 210 and/or the populating component 212 can also include the predictions for the one or more feature vectors and class prediction, which can be referred to as $z_{predict}$.

In some embodiments described herein, each instance of y and z can be combined or merged, via the training component 218, into a unique augmented label yz. Then, a 3-tuple(x, yz) can be used as training input into an AI technique, such as any standard supervised machine learning classification algorithm (for example, an SVM algorithm, a nearest neighbor (NN) algorithm, and the like). The AI technique can produce a classifier, C, where x can represent the set of one or more feature vectors and the augmented label yz can represent a class corresponding to those one or more feature vectors. The classifier C can be used to classify new data instances which can be represented as feature vectors $x_{real}$ (corresponding to real world data) and thereby can produce a class $y_{output}$.

In some embodiments described herein, a baseline (x,y) classifier (that is, a classifier without prediction z) can be used, by the generating component 210 and/or the populating component 212, for performing a prediction on future x values. The (x, yz) classifier (including a prediction) can be used for generating and populating a given report. In some embodiments described herein, the (x, yz) classifier and the (x, y) classifier can predict different y values. In some situations, using the baseline classifier can yield a better classification. In another aspect, disagreements in the two classifiers can show cases where further investigation is desirable (such as more training data or better refinement of report classes). For example, such a case can indicate that similar training x values are mapping to two different predictions z. In some embodiments described herein, a yz classifier can be trained on each class y; then the baseline xy classifier can be used to find the class y while the yz classifier can be used to find the prediction z.

The various components (e.g. the generating component 210, the populating component 212, the prompting component 214, the training component 218, and/or other components) of system 100 can be connected either directly or via one or more networks. Such networks can include wired and wireless networks, including, but not limited to, a cellular network, a WAN (e.g., the Internet), or a LAN, non-limiting examples of which include cellular, Wi-Fi, Wi-Max, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 3:
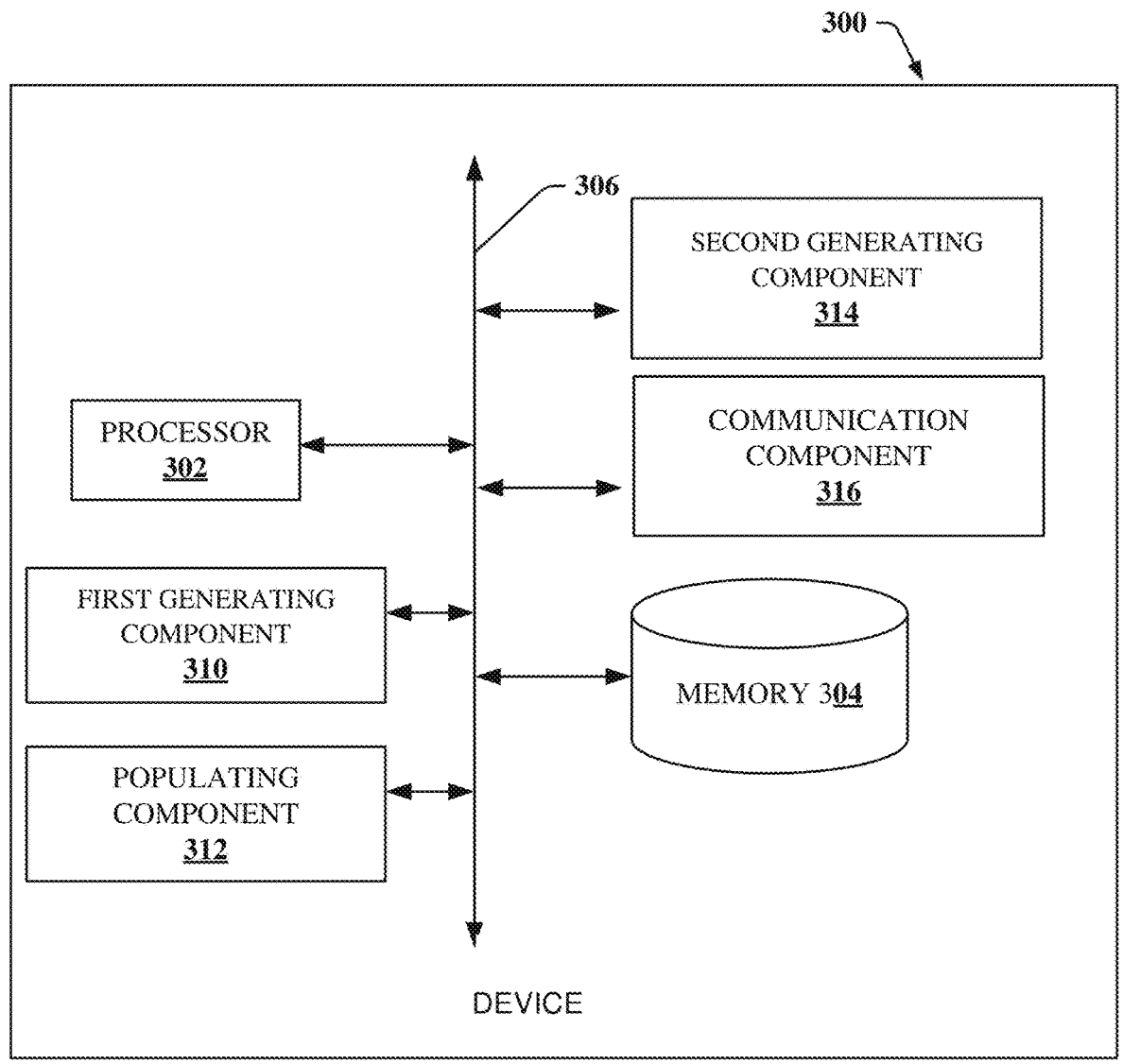
FIG. 3 shows a block diagram of an example, non-limiting computer device that provides AI-produced reports in accordance with one or more embodiments described herein.

FIG. 3 illustrates a block diagram of an example, non-limiting computer program device 300 for AI-populated and generated reports in accordance with one or more embodiments described herein. Aspects of computer program devices (e.g., device 300 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

Device 300 can optionally include a server device, one or more networks and one or more devices (not shown). The device 300 can also include or otherwise be associated with at least one processor 302 that executes computer executable components stored in memory 304. The device 300 can further include a system bus 306 that can couple various components including, but not limited to, a first generating component 310, a populating component 312, and a second generating component 314. The device 300 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the device 300 and/or any other suitable device that can employ information provided by device 300. It is to be appreciated that device 300, components, models or devices can be equipped with communication component 316 that enable communication between the system, components, models, devices, etc. over one or more networks.

As mentioned, an AI system can generate a report. Accordingly, the first generating component 310 can generate a report from a template or schema. In some embodiments the template or schema exists on a database of templates/schemas. The database can optionally exist on the AI system or optionally exist on an external system accessible by the AI system via a network. In other embodiments the AI system can receive the template or schema from an entity.

In some embodiments, the first generating component 310 can generate a report with at least one section and/or at least one option. For example, a report for a medical examination can include a section and/or an option for a medical history of a patient. In some embodiments, the type of the at least one section and/or at least one option that is selected for inclusion in the generated report can be based on known information or a prediction regarding the audience of the report, a situation that preceded generation of the report, and/or compulsory input to the report. In some embodiments, the first generating component 310 can add the at least one section and/or at least one option of the generated report by accessing the known information stored directly on the AI system local memory, or, alternatively, the known information stored on the external system memory. The known information can be accessed by the system by first running an algorithm which can determine whether the known information stored locally or externally to the system is relevant to the report that is being generated. The algorithm can identify keywords and/or key phrases relevant to the report to be generated, and then execute a search of the known information for documents and other types of stored information that contain the identified keywords and/or key phrases, where the keywords and/or key phrases can be determined by a separate algorithm which looks at factors such as frequency of use, location within document, size of font relative to other words/phrases in the document, and word class. After locating the documents and other types of stored information which contain the identified keywords and/or key phrases, the system can then execute an operation which can allow the system to copy the known information and reproduce the known information in the generated report.

In other embodiments, the first generating component 310 can add the at least one section and/or at least one option of the generated report by predicting information relevant to the report to be generated. The system can run an algorithm which can determine whether the known information stored locally or externally to the system is relevant to the report that is being generated. The algorithm can identify keywords and/or key phrases relevant to the report to be generated, and then execute a search of the known information for documents and other types of stored information that contain the identified keywords and/or key phrases, where the keywords and/or key phrases can be determined by a separate algorithm which looks at factors such as frequency of use, location within document, size of font relative to other words/phrases in the document, and word class. After locating the documents and other types of stored information which contain the identified keywords and/or key phrases, the system can then run a second algorithm which can determine whether a document found containing the identified keywords and/or key phrases constitutes a report similar to the report to be generated. The system can then execute an operation which can allow the system to compare the information in the similar documents to the information in the report to be generated. If information is found by the system which appears in the known information that does not appear in the similar documents, but is otherwise determined to be relevant to the report to be generated, the system can execute a separate operation which will add the at least one section and/or at least one option based on the information appearing in the known information that does not appear in the similar documents.

In other embodiments, the known information can comprise the audience of the report. The system can run an algorithm that determines whether documents in the known information were sent to a party or parties, and whether the documents were accessed by a party or parties by examining the meta data for the documents, the name and date information contained within the documents, and notification logs regarding sent/received documents to which the system has access. After determining which documents in the known information were sent/received or otherwise accessed by a party or parties (i.e., had an audience), the system can then run a second algorithm to determine whether the report to be generated is similar to any of the identified documents that were determined to have an audience, comprising a keyword and/or key phrase search. The system can then execute an operation which can allow the system to copy the known information and reproduce the known information in the generated report.

In alternative embodiments, the known information can comprise a situation that preceded generation of the report. The system can run an algorithm that determines whether documents in the known information contain information that overlaps with information already included in the report to be generated, or information that directly or indirectly references information already included in the report to be generated. After determining which documents in the known information contain information that overlaps with the information already included in the report to be generated or that directly or indirectly references the information already included in the report to be generated (i.e., reference a situation that preceded generation of the report), the system can then run a second algorithm to determine whether the report to be generated is similar to any of the identified documents that were determined to reference a situation that preceded generation of the report, comprising a keyword and/or key phrase search. The system can then execute an operation which can allow the system to copy the known information and reproduce the known information in the generated report.

In other embodiments, the known information can comprise compulsory input to the report. The system can run an algorithm that determines whether documents in the known information contain information that is compulsory input to the report. To determine whether information is compulsory, the system can determine which documents are similar to the report to be generated by running an algorithm that performs a keyword and/or key phrase search of the documents in the known information. After determining which documents in the known information are similar to the report to be generated, the system can run a second algorithm which can compare the information contained in the documents determined to be similar to the report to be generated to the information contained in the report to be generated. A third algorithm can then determine which information in the similar documents can be considered compulsory information by considering factors such as frequency of occurrence, impetus for information (e.g., is the information mandated by law or policy?), and source of information (e.g., is the source of the information a party or parties in a position of authority?). After determining the compulsory information contained in the documents in the known information, the system can then run a fourth algorithm to determine whether the report to be generated is similar to any of the identified documents that were determined to contain compulsory information, comprising a keyword and/or key phrase search. The system can then execute an operation which can allow the system to copy the known information and reproduce the known information in the generated report.

In other embodiments, the at least one section and/or at least one option added to the report by the first generating component 310 can comprise at least one of a title page, an abstract, an executive summary, an introduction, a results discussion, methods and procedures, figures and tables, a conclusion, and a reference list. In alternative embodiments, the at least one section and/or at least one option added to the report by the first generating component 310 can comprise at least one of a medical history, a medical analysis, a list of transactions, a description of transactions, an analysis of transactions, a description of an incident, and an analysis of an incident. To determine types of sections and/or options to include in the report to be generated, the system can run an algorithm that compares keywords and/or key phrases in the information already included in the report to be generated with keywords and/or key phrases in the documents in the known information. If the similar documents in the known information contain a section and/or an option that the report to be generated does not already contain, the system can execute an operation whereby the previously absent section and/or option is added into the report to be generated. The operation comprising copying information from the similar documents and reproducing the copied information in the report. In other embodiments, if the similar documents in the known information do not contain a section and/or option that the report to be generated does not already contain, but other documents in the known information do contain a section and/or option that the report to be generated does not already contain, the system can execute an operation whereby the previously absent section and/or option is added into the report to be generated. The operation comprising copying information from the documents and reproducing the copied information in the report.

For example, if the report to be generated contains a medical history section and/or option, and the similar documents contain a medical history section and/or option and a medical analysis section and/or option, the system can determine that the report to be generated should include a medical analysis section and/or option. If the report to be generated contains a transaction history section and/or option, and the similar documents contain a transaction history section and/or option and a transaction analysis section and/or option, the system can determine that the report to be generated should include a transaction analysis section and/or option. If the report to be generated contains an incident description section and/or option, and the similar documents contain an incident description section and/or option and an incident analysis section and/or option, the system can determine that the report to be generated should include an incident analysis section and/or option. If the report to be generated contains a methods and procedures section and/or option, and the similar documents contain a methods and procedures section and/or option and a results discussion section and/or option, the system can determine that the report to be generated should include a results discussion section and/or option.

In other embodiments, the determining whether the first generating component 310 should add a section and/or option to the report to be generated can be determined by the system predicting a section and/or option to include in the report. The predicting can be performed by the system running an algorithm whereby the system determines keywords and/or key phrases in the report to be generated, followed by the system running a second algorithm that compares the keywords and/or key phrases in the report to be generated with keywords and/or key phrases appearing in documents that are not determined to be similar to the report to be generated. After matching keywords and/or key phrases with the documents in the known information, the system can perform the operation of adding a section and/or option to the report to be generated based on the section and/or option appearing in the non-similar documents. The operation comprising copying information from the documents and reproducing the copied information in the report.

In some embodiments described herein, the populating component 312 can populate the at least one section and/or at least one option of the generated report with information. In some embodiments, the information with which the device 300 populates the report can be information known by the device 300 prior to generating the report. In other embodiments, the information with which the device 300 populates the report can be information received from an entity.

In some embodiments described herein, the second generating component 314 can generate technical content which provides information regarding why the report is generated. The technical content generated by the second generating component 314 can be information stored locally on the system memory or, alternatively, the technical content can be information stored on an external system. The technical information can be accessed by the system by first running an algorithm which can determine whether the information stored locally or externally to the system is relevant to the report that is being generated. To determine relevancy of information, the algorithm can identify keywords and/or key phrases relevant to the report to be generated, and then execute a search of the information for documents and other types of stored information that contain the identified keywords and/or key phrases. The keywords and/or key phrases can be determined by a separate algorithm which looks at factors such as frequency of use, location within document, size of font relative to other words/phrases in the document, and word class. After locating the documents and other types of stored information which contain the identified keywords and/or key phrases, the system can then execute an operation which can allow the system to copy the information and reproduce the information in the generated report.

In other embodiments, the technical content generated by the second generating component 314 can be information predicted by the system, where the system predicts information to include in the technical content based on at least one of information contained in similar documents in the known information, and information contained in documents in the known information that have been determined to not be similar documents. The prediction of information can comprise running an algorithm to compare the information already included in the report to be generated with information in the similar documents and/or other documents in the known information, and then running a second algorithm to determine relevance of information found in the similar documents and/or other documents. After determining the relevance of information contained in the similar documents and/or other documents that is not already contained in the report to be generated, the system can execute an operation which allows the system to copy the relevant information in the similar documents and/or other documents in the known information and then reproduce the relevant information in the report to be generated.

In other embodiments, the technical content can include at least one of: a result of the decision-making process that preceded the generation of the report, a different report obtained by the device 300 prior to the generation of the report, at least one factor determined by the device 300 prior to the generation of the report, the result of a reasoning process that preceded the generation of the report, the reason why an option was included in the report, or the reason why an option was not included in the report. In some embodiments, the decision-making process that preceded the generation of the report can comprise at least one of: one or more documents stored locally on the system or externally on another system, and one or more communications or communication logs stored locally on the system or externally on another system. The one or more documents, communications, and communication logs can contain information regarding at least one of a response or non-response to an incident, occurrence, or event, the nature of the incident, occurrence, or event, and the effect of the incident, occurrence, or event on at least one party or entity. In some embodiments, the system can access the one or more documents, communications, or communication logs by first running an algorithm that will implement a keyword and/or key phrase search of the one or more documents, communications, or communication logs to identify which of the one or more documents, communications, or communication logs contain information relevant to the report to be generated. The keywords and/or key phrases can be determined by a separate algorithm which looks at factors such as frequency of use, location within document, size of font relative to other words/phrases in the document, and word class. After identifying documents, communications, and communication logs which contain information relevant to the report to be generated, the system can execute an operation comprising copying the relevant information and reproducing the relevant information in the technical content. In some embodiments, the system can run another algorithm which can weigh the relative relevance of the relevant information which uses factors such as chronological appearance of the information, frequency of occurrence, source of the information, and location of the information. In other embodiments, the system can reproduce the copied information in one of chronological order or order of weighted relevance (as determined by the system).

In other embodiments, the at least one factor determined by the device 300 prior to the generation of the report can comprise at least one of: a foreseeable effect the incident, occurrence, or event could have on a party or entity, a foreseeable outcome of a response or non-response to the incident, occurrence, or event, a measured effect the incident, occurrence, or event has been determined to have on an interested party or entity, a measured outcome of a response or non-response to the incident, occurrence, or event, a determined unpredictability of the effect the incident, occurrence, or event could have on a party or entity, or a determined unpredictability of the outcome of a response or non-response to the incident, occurrence, or event. In some embodiments, the system can determine the at least one factor by accessing known information stored either locally on the system or externally on another system, where the system can access the known information by running an algorithm which executes a keyword and/or key phrase search of documents and other types of information in the known information. The system can then run a second algorithm which can determine whether the documents and other types of information in the known information comprise documents that are similar to the report to be generated. The documents and other types of information can be determined to be similar to the report to be generated if the information contained in the documents and other types of information contain a pre-determined aggregate quantity of matching keywords and/or phrases. After the system has determined which of the documents and other types of information comprise similar documents, the system can run yet another algorithm that can tabulate the effects of the incidents, occurrences, or events on parties or entities, and/or the outcomes of responses or non-responses to the incidents, occurrences, or events in the similar documents. The system can then run another algorithm which can calculate the frequency of different effects and outcomes and the causal factors that contributed to the effects and outcomes to determine likely effects and outcomes in similar (or identical) circumstances (e.g., the system can use the information on frequency of effects and outcomes and the causal factors to predict effects and outcomes and apply those predicted effects and outcomes to the at least one factor determined by the device 300 prior to the generation of the report). In some embodiments, documents and other types of information that are not determined to comprise similar documents can also be used by the system to predict effects and outcomes and apply those predicted effects and outcomes to the at least one factor determined by the device 300 prior to the generation of the report. The documents and other types of information that are not similar documents can be determined by the system to have a sufficient relation to the report to be generated, where the frequency of different effects and outcomes and the causal factors that contributed to the effects and outcomes in the not similar documents can be used to determine likely effects and outcomes in unrelated circumstances that otherwise share one or more causal factor and/or one or more effect or outcome.

In some embodiments, the result of a reasoning process that preceded the generation of the report can comprise at least one of: one or more documents stored locally on the system or externally on another system, and one or more communications or communication logs stored locally on the system or externally on another system. The one or more documents, communications, and communication logs can contain information regarding at least one of a description of an incident, occurrence, or event, a description of parties or entities affected by the incident, occurrence, or event, and issues related to the incident, occurrence, or event discussed by parties or entities affected by the incident, occurrence, or event. In some embodiments, the system can access the one or more documents, communications, or communication logs by first running an algorithm that will implement a keyword and/or key phrase search of the one or more documents, communications, or communication logs to identify which of the one or more documents, communications, or communication logs contain information relevant to the report to be generated. The keywords and/or key phrases can be determined by a separate algorithm which looks at factors such as frequency of use, location within document, size of font relative to other words/phrases in the document, and word class. After identifying documents, communications, and communication logs which contain information relevant to the report to be generated, the system can execute an operation comprising copying the relevant information and reproducing the relevant information in the technical content. In some embodiments, the system can run another algorithm which can weigh the relative relevance of the relevant information which uses factors such as chronological appearance of the information, frequency of occurrence, source of the information, and location of the information. In other embodiments, the system can reproduce the copied information in one of chronological order or order of weighted relevance (as determined by the system).

In other embodiments, the reason why an option was included in the report, or the reason why an option was not included in the report can comprise at least one of: one or more documents stored locally on the system or externally on another system, and one or more communications or communication logs stored locally on the system or externally on another system. The one or more documents, communications, and communication logs can contain information regarding at least one of a policy regarding reports similar to the report to be generated, an analysis of possible options and/or sections in similar reports, and an analysis of the incident, occurrence, or event that was the impetus for generation of the report. In some embodiments, the system can access the one or more documents, communications, or communication logs by first running an algorithm that will implement a keyword and/or key phrase search of the one or more documents, communications, or communication logs to identify which of the one or more documents, communications, or communication logs contain information relevant to the report to be generated. The keywords and/or key phrases can be determined by a separate algorithm which looks at factors such as frequency of use, location within document, size of font relative to other words/phrases in the document, and word class. After identifying documents, communications, and communication logs which contain information relevant to the report to be generated, the system can execute an operation comprising copying the relevant information and reproducing the relevant information in the technical content. In some embodiments, the system can run another algorithm which can weigh the relative relevance of the relevant information which uses factors such as chronological appearance of the information, frequency of occurrence, source of the information, and location of the information. In other embodiments, the system can reproduce the copied information in one of chronological order or order of weighted relevance (as determined by the system).

The various components (e.g., the first generating component 310, the populating component 312, the second generating component 314, and/or other components) of device 300 can be connected either directly or via one or more networks. Such networks can include wired and wireless networks, including, but not limited to, a cellular network, a WAN (e.g., the Internet), or a LAN, non-limiting examples of which include cellular, Wi-Fi, Wi-Max, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 4A:
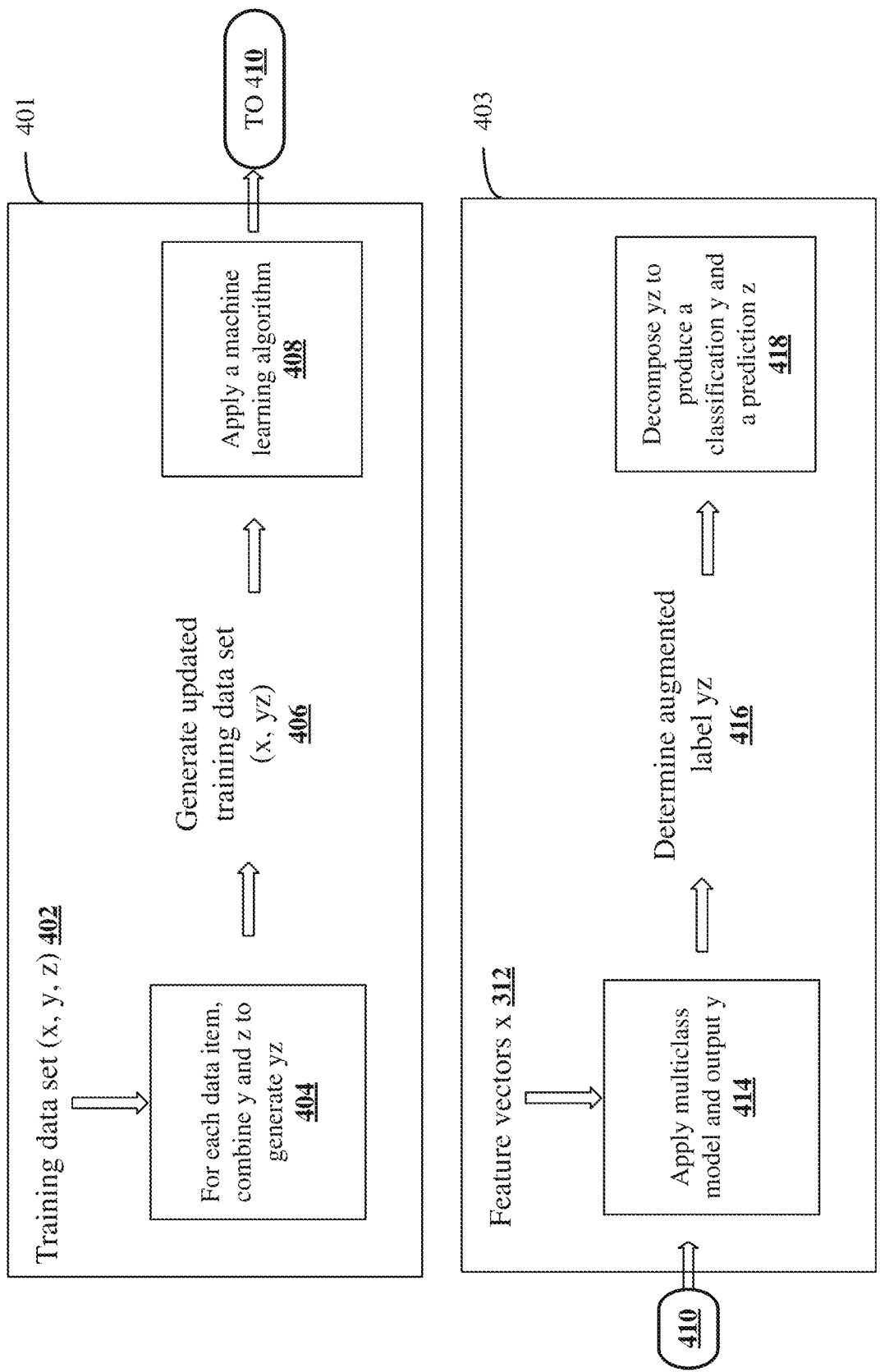
FIG. 4A shows diagrams of an example implementation of an AI system that generates reports and predicts information to include in the generated reports in accordance with example embodiments of one or more embodiments.

FIG. 4A shows a diagram of an example implementation of an AI system that can generate reports and can predict information to include in the generated reports, in accordance with example embodiments. At block 404, the system (e.g., via generating component 403) can, for one or more data items in the training data set 402, combine the classification y with a prediction z, thereby generating an augmented label yz. The system (e.g., via training component 407) can assign classification y to one or more data items in the training data set 402 to allow the system to sort the one or more data items into easier to manage, search, and compile groups of data. For example, the one or more data items assigned classification y can be a document containing information. In some embodiments, the system (e.g., via populating component 404) can use the classification y to determine the type of information contained in the document, and then the system can determine whether the information in the document is relevant to a report to be generated.

In other embodiments, the system (e.g., via populating component 404) can use classification y to determine whether the information in the document is relevant to the report to be generated, and the system can further predict information that should be included in the report to be generated. The system (e.g., via generating component 403) can determine prediction z by accessing all of the one or more data items in the training data set 402, and then using classification y to search for any documents or other types of data that contain information relevant to the report to be generated, where the relevance of the information is determined by a defined aggregate quantity (such as a certain percentage of a particular document contains keywords and/or key phrases) of keywords and/or key phrases in the documents and other types of data. The keywords and key phrases can be determined using classification y, where the system searches the documents and other types of data to determine if the documents and other types of data comprise documents similar to the report to be generated.

In some embodiments, the system (e.g., via populating component 404) can populate the report to be generated with information similar to the information contained in the similar documents. In other embodiments, the system (e.g., via populating component 404) can add or change at least one section and/or at least one option of the report to be generated based on the information contained in the similar documents. In other embodiments, the system (e.g., via generating component 403) can use classification y to predict information that should be included in the report to be generated, where classification y and the prediction z are combined to form augmented label yz. Augmented label yz can be a label for information that was located by the system, using classification y, in the similar documents. Alternatively, augmented label yz can be a label for information that was located by the system, using classification y, in documents that were not determined by the system to be similar to the report to be generated.

In some embodiments, though some documents or other types of data can be determined by the system (e.g., via generating component 403) to comprise a similar document for failure to possess the requisite aggregate quantity of keywords and/or key phrases, the system can use classification y to determine that portions of the information in the not similar documents are similar enough that the system can use the information to predict information that should be included in the report to be generated. In some embodiments described herein, the augmented label can be a concatenation of classification y and a prediction z, or can be a more sophisticated combination for y and z (e.g., a hashed combination).

At block 406, the system (e.g., via training component 407) can generate an updated training data set (x, yz), based on the augmented label, yz. In some embodiments, the prediction z can be a prediction of at least one section and/or at least one option to include in the report to be generated. For example, the system (e.g., via generating component 403) can use classification y to search the documents and other types of data for similar documents, and, if a defined amount (such as a majority or a percentage such as over 51% or 75%) of the similar documents contain a particular report section and/or report option, the system can add that particular report section and/or report option to the report to be generated. If the system (e.g., via generating component 403) determines, using classification y to search through the documents and other types of data, that a defined amount (such as a majority or a percentage such as over 51% or 75%) of not similar documents contain a particular report section and/or report option, the system can determine that that report section and/or report option should be included in the report to be generated.

In some embodiments, the classification y can comprise sorting the one or more data items into groups or clusters, followed by further sorting the one or more data items until all of the one or more data items have been organized into unique, individual data points that are clustered with the most similar data points of the one or more data items.

In some embodiments, the augmented label yz can comprise a reference point or command used by the system to assist in navigating the one or more data items, where the reference point or command is a combination of the classification y and the prediction z.

At block 408, the system (e.g., via training component 407) can apply a machine learning algorithm to the updated training data set, thereby leading to the generation of a model (e.g., a multiclass model). The output of the system can be used, at 410, by a generating component 403 and/or a populating component 404, which can apply the model based on the updated training data set (x, yz) to real world data. In particular, the system (e.g., via generating component 403) can receive real world data (e.g., data pertaining to an actual incident, occurrence, and/or event that is not theoretical or hypothetical) that can include one or more feature vectors x 412. At 414, the system (e.g., via populating component 404) can apply the model (e.g., the multiclass model) and thereby generate as an output, a classification, y. At 416, the system (e.g., via generating component 403) can determine an augmented label yz based on the generated classification y. At 418, the system can decompose yz and generate a classification y and a prediction z.

Figure 4B:
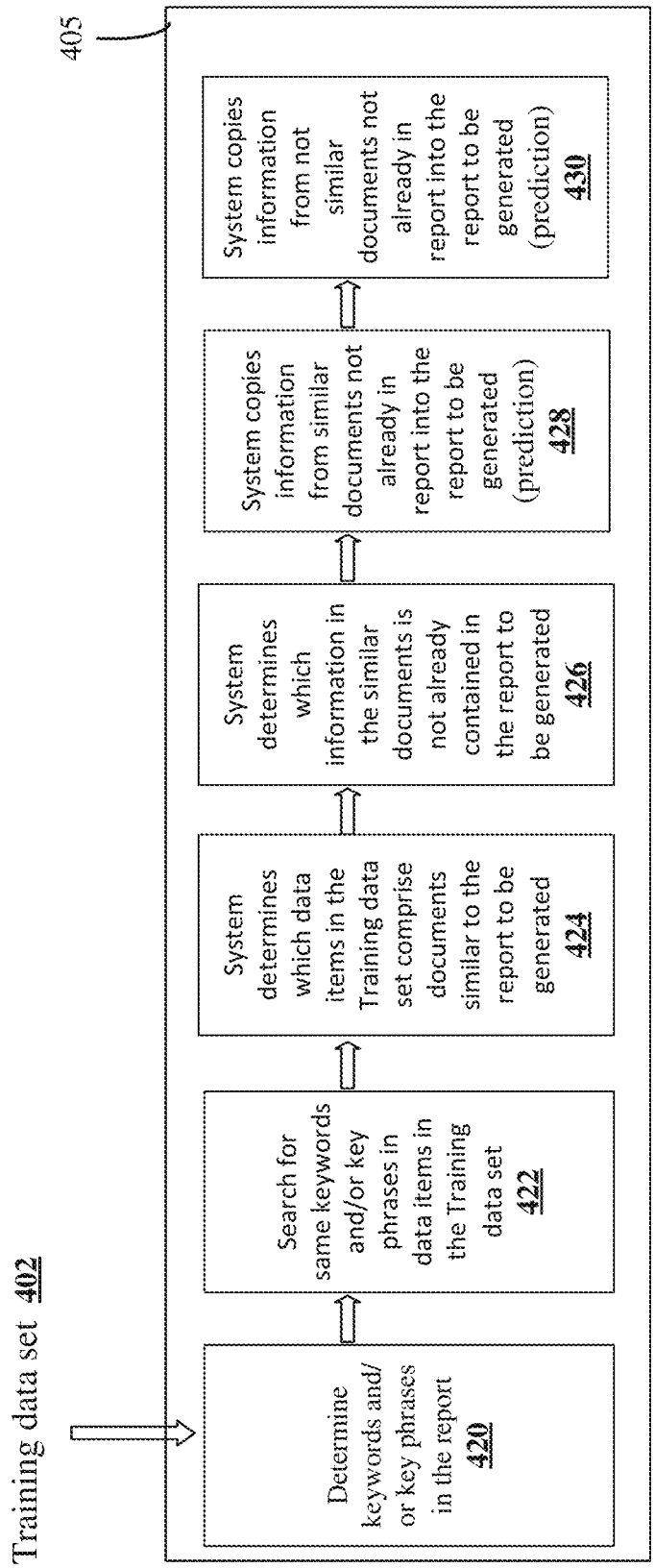
FIG. 4B shows a diagram of an example implementation of the steps the AI system performs to predict information to include in the generated reports, in accordance with example embodiments.

FIG. 4B shows a diagram 405 of an example implementation of the computer-implemented steps the AI system can perform to predict information to include in the generated reports, in accordance with example embodiments. Repetitive description of like elements employed in one or more embodiments described herein is omitted for sake of brevity. In particular, diagram 405 can represent a prediction aspect of the system functionality. In some embodiments, a training data set 402 can be received by the training component 407 of the system. At block 420, the system (e.g., via generating component 403) can, using classification y, determine keywords and/or key phrases in the report to be generated. At block 422, the system (e.g., via training component 407) can, for each data item in the training data set 402, use classification y to search for the same keywords and/or key phrases in each data item in the training data set 402. At block 424, the system (e.g., via training component 407) can determine which documents and other types of data in the training data set 402 comprise documents that are similar to the report to be generated, and which documents and other types of data are nor similar documents. At block 426, the system (e.g., via generating component 403) can determine which information in the similar documents is not already contained in the report to be generated. At block 428, since the information in the similar documents was not already in the report to be generated, the system (e.g., via populating component 404) can copy the information from the similar documents into the report to be generated, amounting to a prediction of information that should be included in the report to be generated. In some embodiments, the system (e.g., via generating component 403) can determine that the similar documents contain a section and/or option not contained in the report to be generated, and the system can copy the report section and/or option from the similar documents into the report to be generated, amounting to a prediction of report section and/or option that should be included in the report to be generated. At block 430, the system (e.g., via generating component 403) can determine that a defined percentage of the not similar documents contain information not already contained in the report to be generated, and the system can copy the information from the not similar documents into the report to be generated, amounting to a prediction of information that should be included in the report to be generated. In some embodiments, the system (e.g., via generating component 403) can determine that the not similar documents contain a section and/or option not contained in the report to be generated, and the system can copy the report section and/or option from the not similar documents into the report to be generated, amounting to a prediction of report section and/or option that should be included in the report to be generated.

Figure 4C:
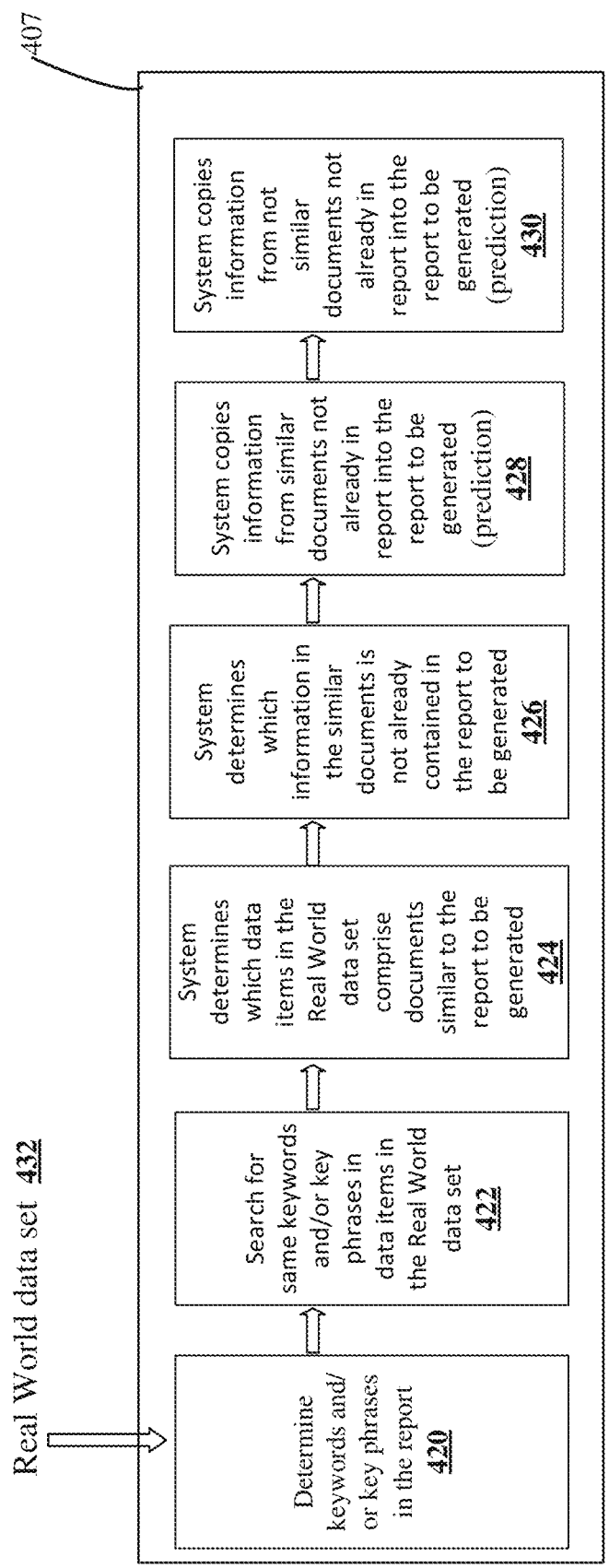
FIG. 4C shows a diagram of another example implementation of the steps the AI system performs to predict information to include in the generated reports, in accordance with example embodiments.

FIG. 4C shows a diagram of an example implementation of the steps the AI system performs to predict information to include in the generated reports, in accordance with example embodiments. Repetitive description of like elements employed in one or more embodiments described herein is omitted for sake of brevity. In particular, diagram 407 can represent a prediction component of the system. In some embodiments, a real world data set 432 can be received by the system. At block 420, the system (e.g., via generating component 403) can, using classification y, determine keywords and/or key phrases in the report to be generated. At block 422, the system (e.g., via generating component 403) can, for each data item in the real world data set 432, use classification y to search for the same keywords and/or key phrases in each data item in the real world data set 432. At block 424, the system (e.g., via generating component 403) can determine which documents and other types of data in the real world data set 432 comprise documents that are similar to the report to be generated, and which documents and other types of data are nor similar documents. At block 426, the system (e.g., via generating component 403) can determine which information in the similar documents is not already contained in the report to be generated. At block 428, since the information in the similar documents was not already in the report to be generated, the system (e.g., via populating component 404) can copy the information from the similar documents into the report to be generated, amounting to a prediction of information that should be included in the report to be generated. In some embodiments, the system (e.g., via generating component 403) can determine that the similar documents contain a section and/or option not contained in the report to be generated, and the system can copy the report section and/or report option from the similar documents into the report to be generated, amounting to a prediction of report section and/or report option that should be included in the report to be generated. At block 430, the system (e.g., via generating component 403) can determine that a defined percentage of the not similar documents contain information not already contained in the report to be generated, and the system can copy the information from the not similar documents into the report to be generated, amounting to a prediction of information that should be included in the report to be generated. In some embodiments, the system (e.g., via generating component 403) can determine that the not similar documents contain a section and/or option not contained in the report to be generated, and the system (e.g., via populating component 404) can copy the report section and/or option from the not similar documents into the report to be generated, amounting to a prediction of report section and/or report option that should be included in the report to be generated.

Figure 5:
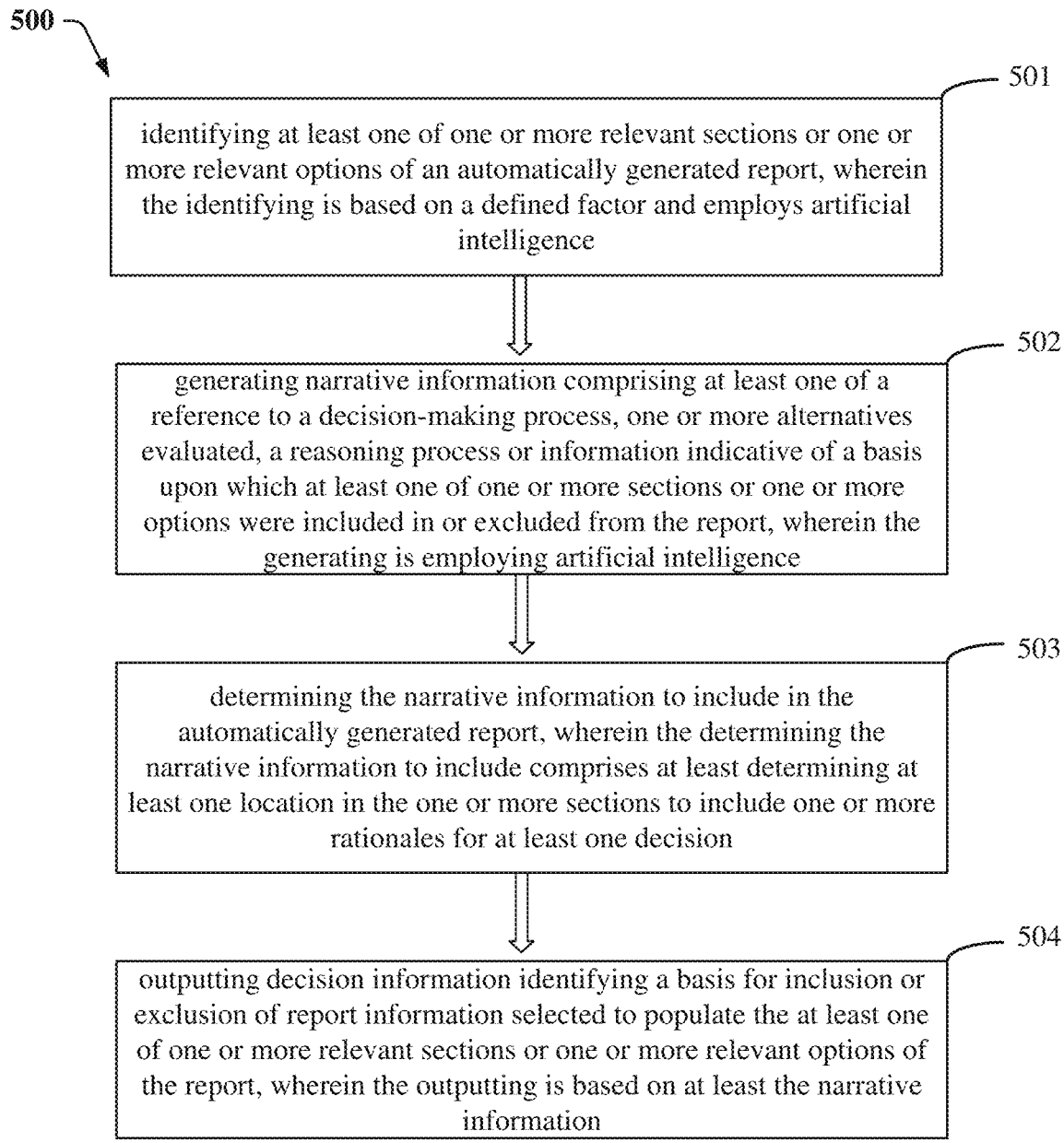
FIG. 5 shows a diagram of an example flowchart of a computer-implemented method facilitating populating and generating a report in accordance with example embodiments of one or more embodiments.

FIG. 5 shows a diagram of an example flowchart of a computer-implemented method facilitating populating and generating a report in accordance with example embodiments of one or more embodiments. Repetitive description of like elements employed in one or more embodiments described herein is omitted for sake of brevity. At block 501, the computer-implemented method can comprise identifying (e.g., via the generating component 110) at least one of one or more relevant sections or one or more relevant options of an automatically generated report, wherein the identifying is based on a defined factor and employs artificial intelligence. In some embodiments, the defined factor comprises at least one of a subject matter of the report, an audience for which the report is automatically generated, a filing need associated with the report, or a document associated with the report. In some embodiments, the filing need comprises a regulatory filing need, a governmental filing need, or an administrative filing need.

At block 502, the computer-implemented method can comprise generating (e.g., via the generating component 110) narrative information comprising at least one of a reference to a decision-making process, one or more alternatives evaluated, a reasoning process or information indicative of a basis upon which at least one of one or more sections or one or more options were included in or excluded from the report, wherein the generating is employing artificial intelligence.

At block 503, the computer-implemented method can comprise determining (e.g., via the populating component 112) the narrative information to include in the report, wherein the determining the narrative information to include comprises at least determining at least one location in the one or more sections to include one or more rationales for at least one decision.

At block 504, the computer-implemented method can comprise outputting (e.g., via the populating component 112 and/or the communication component 116) decision information identifying a basis for inclusion or exclusion of report information selected to populate the at least one of one or more relevant sections or one or more relevant options of the report, wherein the outputting is based on at least the narrative information.

In some embodiments, the computer-implemented method can also comprise prompting (e.g., via the prompting component 114) input information to determine at least one of additional relevant sections of the report, additional relevant options of the report or additional information to populate the report, if the system cannot determine the input information on its own, wherein the system has determined that the additional relevant sections, the additional relevant options, or the additional information cannot be inferred from the narrative information.

In some embodiments, the computer-implemented method further comprises: automatically generating (e.g., via the generating component 110) the report based on a template or schema, wherein the automatically generating is performed prior to the determining the at least one of one or more relevant sections or one or more relevant options; and populating (e.g., via the populating component) the report based on the narrative information. The automatically generating can be performed employing artificial intelligence.

In some embodiments, the computer-implemented method can comprise updating (e.g., via the training component 218 or the system 100), based on at least the input information, training data to be used by the system on an internal model of the system at least one of to improve a function of the internal model or to improve a capability to predict entity input in reports generated by the system, wherein the system uses the input information to update the training data. In some embodiments, the computer-implemented method can comprise updating (e.g., via the generating component 110 or the system 100) based on at least the input information, the at least one of one or more relevant sections or one or more relevant options included in the report.

In some embodiments, there can be at least three entities that can receive and benefit from predictions provided by the AI systems and algorithms described in connection with FIGS. 1-6. A first entity can include end entities, which can include devices, computers, machines or people that will use the generated report. The end entities can also include devices, computers, machines or people that can be impacted by the generated report. In one or more embodiments, a second entity can include government agencies (or devices associated with government agencies), which can have the responsibility to act on information included in the generated report. In one embodiment, a third entity can include AI system devices, builders and/or stakeholders. Such entities can include devices, computers, machines or technical individuals who own, build, or deploy AI systems, and can therefore want to know if the AI systems are working as expected, how to diagnose and improve it, and possibly gain insight from the AI system decisions.

As mentioned, one or more databases used in connection with one or more embodiments can include a database stored or hosted on a cloud computing platform. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active entity accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited entity-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
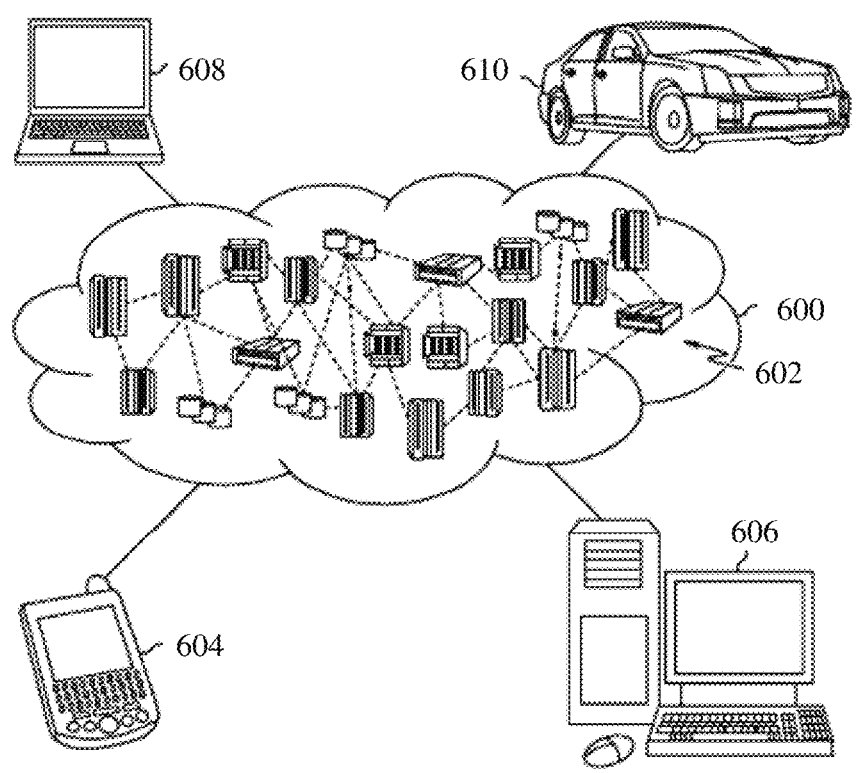
FIG. 6 illustrates a block diagram of an example, non-limiting operating environment in which one or more embodiments described herein can be facilitated.

Referring now to FIG. 6, illustrative cloud computing environment 600 is depicted. Repetitive description of like elements employed in other embodiments described herein is omitted for sake of brevity. As shown, cloud computing environment 600 includes one or more cloud computing nodes 602 with which local computing devices used by cloud consumers, such as, for example, personal digital assistant (PDA) or cellular telephone 604, desktop computer 606, laptop computer 608, and/or automobile computer system 610 can communicate. Nodes 602 can communicate with one another. They can be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604-610 shown in FIG. 6 are intended to be illustrative only and that computing nodes 602 and cloud computing environment 600 can communicate with any type of computerized device over any type of network and/or network addressable connection (e.g., using a web browser).

Figure 7:
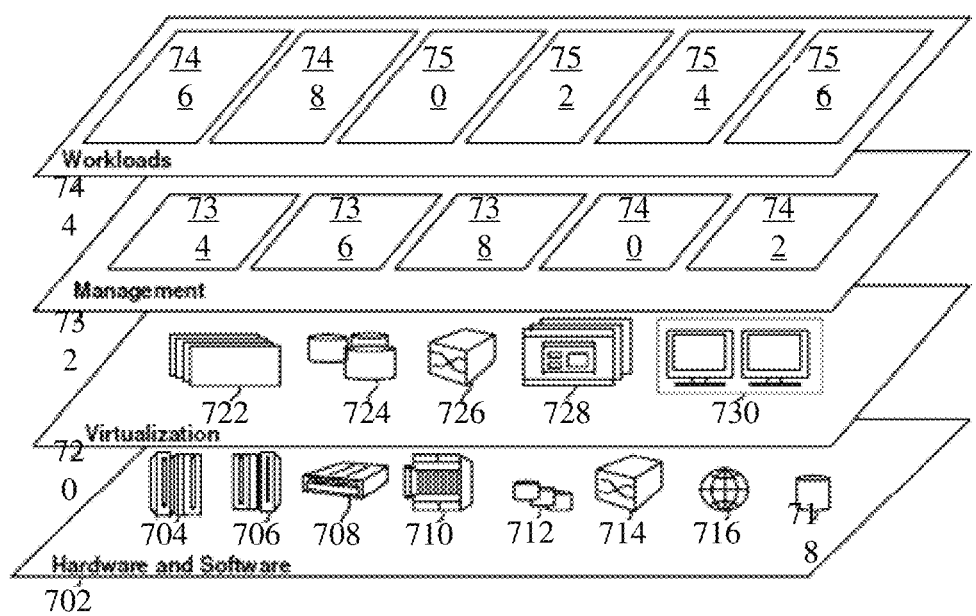
FIG. 7 depicts a cloud computing environment in accordance with one or more embodiments described herein.

Referring now to FIG. 7, a set of functional abstraction layers provided by cloud computing environment 600 (FIG. 6) is shown. Repetitive description of like elements employed in other embodiments described herein is omitted for sake of brevity. It should be understood in advance that the components, layers, and functions shown in FIG. 7 are intended to be illustrative only, and embodiments of the invention are not limited thereto. As depicted, the following layers and corresponding functions are provided.

Hardware and software layer 702 includes hardware and software components. Examples of hardware components include: mainframes 704; RISC (Reduced Instruction Set Computer) architecture-based servers 706; servers 708; blade servers 710; storage devices 712; and networks and networking components 714. In some embodiments, software components include network application server software 716 and database software 818.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 732 can provide the functions described below. Resource provisioning 734 provides dynamic procurement of computing resources and other resources that are utilized to perform tasks within the cloud computing environment. Metering and Pricing 736 provide cost tracking as resources are utilized within the cloud computing environment, and billing or invoicing for consumption of these resources. In one example, these resources can include application software licenses. Security provides identity verification for cloud consumers and tasks, as well as protection for data and other resources. Entity portal 738 provides access to the cloud computing environment for consumers and system administrators. Service level management 740 provides cloud computing resource allocation and management such that required service levels are met. Service Level Agreement (SLA) planning and fulfillment 742 provide pre-arrangement for, and procurement of, cloud computing resources for which a future requirement is anticipated in accordance with an SLA.

Workloads layer 744 provides examples of functionality for which the cloud computing environment can be utilized. Examples of workloads and functions which can be provided from this layer include: mapping and navigation 746; software development and lifecycle management 748; virtual classroom education delivery 750; data analytics processing 752; transaction processing 754; and assessing an entity's susceptibility to a treatment service 756. Various embodiments of the present invention can utilize the cloud computing environment described with reference to FIGS. 6 and 7 to determine a trust disposition value associated with one or more entities and/or determine the susceptibility of the one or more entities to one or more treatment services based on the trust disposition value.

The present invention can be a system, a method, and/or a computer program device at any possible technical detail level of integration. The computer program device can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a LAN or a WAN, or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program devices according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block(s).

The computer readable program instructions can also be loaded onto a computer, other programmable data processing apparatus, or other device to cause a series of operational steps to be performed on the computer, other programmable apparatus or other device to produce a computer implemented process, such that the computer, other programmable apparatus, or other device implement the functions/acts specified in the flowchart and/or block diagram block(s).

The flowchart and block diagrams in the Figures illustrate the architecture, functionality, and operation of possible implementations of systems, methods, and computer program devices according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
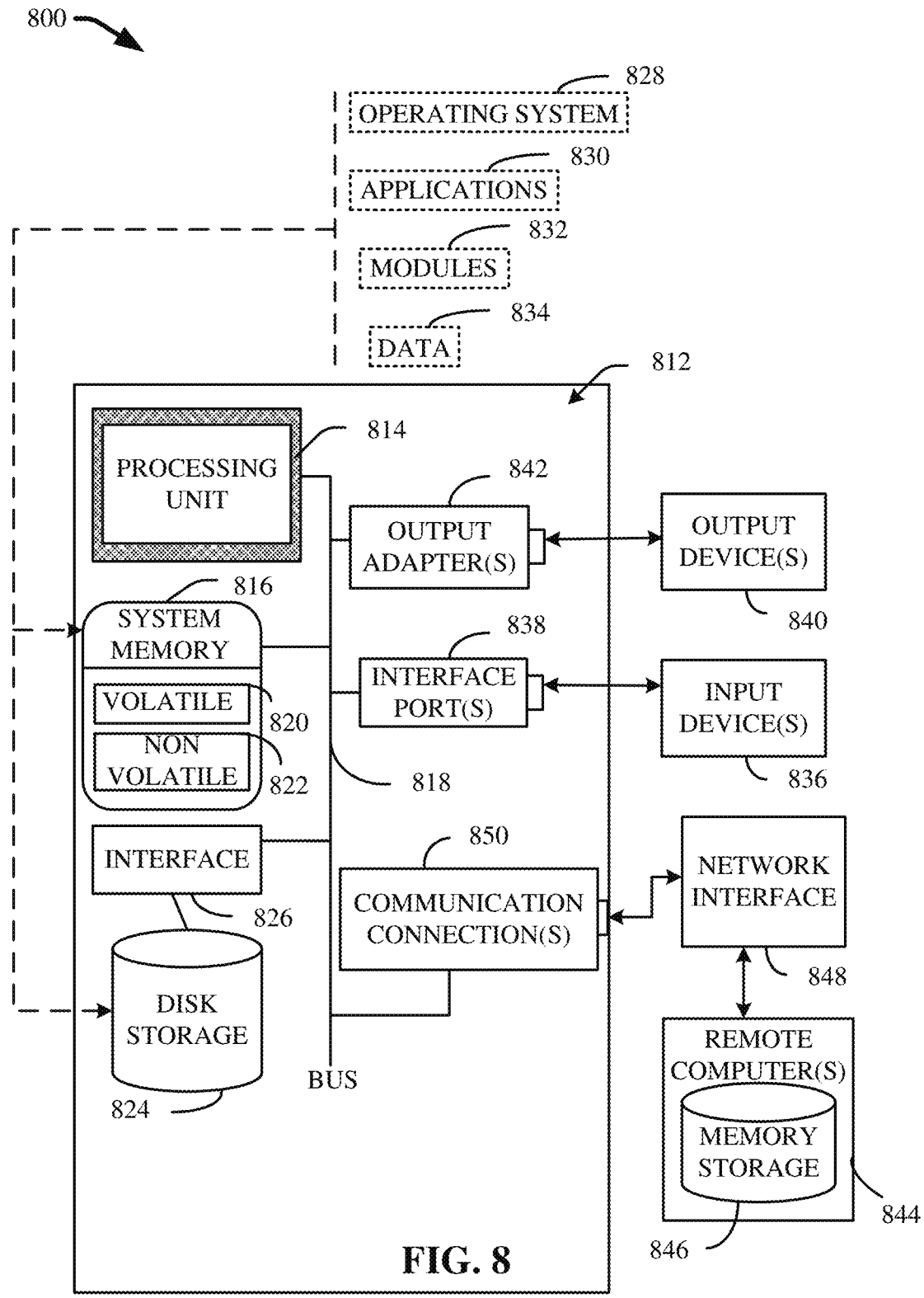
FIG. 8 depicts abstraction model layers in accordance with one or more embodiments described herein.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can include a computer 812. The computer 812 can also include a processing unit 814, a system memory 816, and a system bus 818. The system bus 818 can operably couple system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, can be stored in nonvolatile memory 822. By way of illustration, and not limitation, nonvolatile memory 822 can include ROM, programmable ROM (PROM), electrically programmable ROM (EPROM), electrically erasable programmable ROM (EEPROM), flash memory, or nonvolatile RAM (e.g., ferroelectric RAM (FeRAM). Volatile memory 820 can also include RAM which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a CD-ROM, CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface can be used, such as interface 826. FIG. 8 also depicts software that can act as an intermediary between entities and the basic computer resources described in the suitable operating environment 800. Such software can also include, for example, an operating system 828. Operating system 828, which can be stored on disk storage 824, acts to control and allocate resources of the computer 812. System applications 830 can take advantage of the management of resources by operating system 828 through program components 832 and program data 834, e.g., stored either in system memory 816 or on disk storage 824. It is to be appreciated that this disclosure can be implemented with various operating systems or combinations of operating systems. An entity can enter commands or information into the computer 812 through one or more input devices 836. Input devices 836 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 814 through the system bus 818 via one or more interface ports 838. The one or more Interface ports 838 can include, for example, a serial port, a parallel port, a game port, and a universal serial bus (USB). One or more output devices 840 can use some of the same type of ports as input device 836. Thus, for example, a USB port can be used to provide input to computer 812, and to output information from computer 812 to an output device 840. Output adapter 842 can be provided to illustrate that there are some output devices 840 like monitors, speakers, and printers, among other output devices 840, which require special adapters. The output adapters 842 can include, by way of illustration and not limitation, video and sound cards that provide a means of connection between the output device 840 and the system bus 818. It should be noted that other devices and/or systems of devices provide both input and output capabilities such as one or more remote computers 844.

Computer 812 can operate in a networked environment using logical connections to one or more remote computers, such as remote computer 844. The remote computer 844 can be a computer, a server, a router, a network PC, a workstation, a microprocessor-based appliance, a peer device or other common network node and the like, and typically can also include many or all of the elements described relative to computer 812. For purposes of brevity, only a memory storage device 846 is illustrated with remote computer 844. Remote computer 844 can be logically connected to computer 812 through a network interface 848 and then physically connected via communication connection 850. Further, operation can be distributed across multiple (local and remote) systems. Network interface 848 can encompass wire and/or wireless communication networks such as LANs, WANs, cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program device at any possible technical detail level of integration. The computer program device can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a RAM, a ROM, an EPROM (or Flash memory), an SRAM, a CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a LAN or a WAN, or the connection can be made to an external computer (for example, through the Internet using an Internet Service Provider). In some embodiments, electronic circuitry including, for example, programmable logic circuitry, FPGAs, or PLAs can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program devices according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block(s).

The flowchart and block diagrams in the Figures illustrate the architecture, functionality, and operation of possible implementations of systems, methods, and computer program devices according to various embodiments of the present invention. In this regard, each block in the flowchart or block diagrams can represent a module, component, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program device that runs on a computer and/or computers, those skilled in the art will recognize that this disclosure can be implemented in combination with other program modules or components. Generally, program modules or components include routines, programs, components, data structures, etc. that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules or components can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and Rambus dynamic RAM (RDRAM). Additionally, the disclosed memory components of systems or computer-implemented methods herein are intended to include, without being limited to including, these and any other suitable types of memory.

What has been described above include mere examples of systems, computer program devices and computer-implemented methods. It is, of course, not possible to describe every conceivable combination of components, devices and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
  a training component that trains, using training data, an artificial intelligence model to generate reports from templates, and generate respective narrative information describing reasons for inclusion or exclusion of various content in the reports;
  a generating component that:
    generates, using the artificial intelligence model, narrative information comprising:
      information indicative of a basis upon which at least one of one or more options or one or more types of sections were excluded from an automatically generated report; and
      a defined factor determined prior to the automatically generated report, wherein the defined factor comprises a foreseeable effect the incident, occurrence or event could have on an entity for whom the automatically generated report is to be generated; and
    identifies, using the artificial intelligence model, one or more types of relevant sections of the report, wherein the identification is based on a defined factor, and concatenations of classification labels and prediction labels of known documents; and
  a populating component that:
    determines, using the artificial intelligence model, the narrative information to include in the report, wherein the determining the narrative information to include comprises at least determining at least one location in the one or more types of sections to include one or more rationales for at least one decision; and
    outputs, using the artificial intelligence model, decision information identifying a basis for exclusion of report information selected to populate the at least one of one or more types of relevant sections of the report, wherein the output is based on the narrative information, wherein the basis comprises a reasoning process for exclusion of the one or more types of relevant sections of the report; and
  wherein the training component further:
    initiates, using the artificial intelligence model, an interactive dialog with a person that associated with the report, wherein the interactive dialog comprises questions generated by the artificial intelligence model pertaining to possible deficiencies of the report, and
    based on responses to the questions from the person:
      updates the training data, and
      retrains, using the training data, the artificial intelligence model to generate the reports from the templates, and generate the respective narrative information describing reasons for inclusion or exclusion of various content in the reports.

2. The system of claim 1, further comprising:
a prompting component that prompts an entity for input information to determine at least one of additional type of relevant sections of the report, additional relevant options of the automatically generated report, or additional information to populate the report, if the system cannot determine the input information on its own, wherein the system has determined that the additional type of relevant sections, the additional relevant options, or the additional information cannot be inferred from the narrative information.

3. The system of claim 1, wherein the defined factor further comprises at least one of a subject matter of the report, an audience for which the report is automatically generated, a filing need associated with the report, or a document associated with the report and wherein the reasoning process comprises an analysis of the incident, occurrence, or event that was the impetus for generation of the report.

4. The system of claim 1, wherein the filing need comprises a regulatory filing need, a governmental filing need, or an administrative filing need.

5. The system of claim 1, wherein the generating component also automatically generates the report based on a template selected from the templates, wherein the report is automatically generated prior to the identification of the at least one of one or more types of relevant sections or one or more relevant options, wherein the system determines the defined factor based on accessing known information by running an algorithm that executes a keyword or a key phrase search of documents and other types of information in the known information.

6. A computer-implemented method, comprising:
   training, by a system operatively coupled to a processor, using training data, an artificial intelligence model to generate reports from templates, and generate respective narrative information describing reasons for inclusion or exclusion of various content in the reports;
   generating, by the system, using the artificial intelligence model, narrative information comprising:
      information indicative of a basis upon which at least one of one or more types of sections were excluded from an automatically generated report; and
      a defined factor determined prior to the automatically generated report, wherein the defined factor comprises a measured outcome of a response or non-response to the incident, occurrence, or event on an entity for whom the automatically generated report is to be generated;
   identifying, by the system, using the artificial intelligence model, one or more types of relevant sections or one or more relevant options of the automatically generated report, wherein the identifying is based on a defined factor, and concatenations of classification labels and prediction labels of known documents;
   determining, by the system, using the artificial intelligence model, the narrative information to include in the report, wherein the determining the narrative information to include comprises at least determining at least one location in the one or more types of sections to include one or more rationales for at least one decision;
   outputting, by the system, using the artificial intelligence model, decision information identifying a basis for exclusion of report information selected to populate the at least one of one or more types of relevant sections of the report and why the one or more types of relevant sections were excluded, wherein the basis comprises a plurality of alternative evaluated to determine the one or more types of relevant sections to exclude, and wherein the outputting is based on at least the narrative information;
   initiating, by the system, using the artificial intelligence model, an interactive dialog with a person that associated with the report, wherein the interactive dialog comprises questions generated by the artificial intelligence model pertaining to possible deficiencies of the report; and
   based on responses to the questions from the person:
      updating, by the system, the training data, and
      retraining, by the system, using the training data, the artificial intelligence model to generate the reports from the templates, and generate the respective narrative information describing reasons for inclusion or exclusion of various content in the reports.

7. The computer-implemented method of claim 6, further comprising:
   prompting, by the system, input information to determine at least one type of additional relevant sections of the report, additional relevant options of the report or additional information to populate the report, if the system cannot determine the input information on its own, wherein the system has determined that the additional type of relevant sections, the additional relevant options, or the additional information cannot be inferred from the narrative information.

8. The computer-implemented method of claim 6, wherein the defined factor further comprises at least one of a subject matter of the report, an audience for which the report is automatically generated, a filing need associated with the report, or a document associated with the report.

9. The computer-implemented method of claim 8, wherein the filing need comprises a regulatory filing need, a governmental filing need, or an administrative filing need.

10. The computer-implemented method of claim 6, further comprising:
    automatically generating, by the system, the report based on a template selected from the templates, wherein the automatically generating is performed prior to the determining the at least one of one or more types of relevant sections or one or more relevant options.

11. The computer-implemented method of claim 6, wherein the system determines the defined factor based on accessing known information by running an algorithm that executes a keyword or a key phrase search of documents and other types of information in the known information.

12. The computer-implemented method of claim 6, wherein the updated training data improves a capability to predict entity input in reports generated by the system.

13. The computer-implemented method of claim 6, further comprising:
    updating, by the system, based on at least the input information, the at least one of one or more types of relevant sections or one or more relevant options included in the report.

14. A computer program product facilitating artificial intelligence-generated and populated reports, the computer program product comprising a computer readable storage medium having program instructions embodied therewith, the program instructions executable by a processor to cause the processor to:
   training, by the processor, using training data, an artificial intelligence model to generate reports from templates, and generate respective narrative information describing reasons for inclusion or exclusion of various content in the reports;
   generate, by the processor, using the artificial intelligence model, narrative information comprising:
      information indicative of a basis upon which at least one of one or more types of sections or one or more options were excluded from an automatically generated report; and
      a defined factor determined prior to the automatically generated report, wherein the defined factor comprises a determined unpredictability of the effect the incident, occurrence, or event could have on an entity for whom the automatically generated report is to be generated;
   identifying, by the processor, using the artificial intelligence model, one or more types of relevant sections or one or more relevant options of the automatically generated report, wherein the identifying is based on a defined factor, and concatenations of classification labels and prediction labels of known documents;

determine, by the processor, using the artificial intelligence model, the narrative information to include in the report, wherein the determination of the narrative information to include comprises at least a determination of at least one location in the one or more types of sections to include one or more rationales for at least one decision;

output, by the processor, using the artificial intelligence model, decision information identifying a basis for exclusion of report information selected to populate the at least one of one or more types of relevant sections or one or more relevant options of the report, wherein the output is based on at least the narrative information;

initiating, by the processor, using the artificial intelligence model, an interactive dialog with a person that associated with the report, wherein the interactive dialog comprises questions generated by the artificial intelligence model pertaining to possible deficiencies of the report; and based on responses to the questions from the person:
updating, by the processor, the training data, and
retraining, by the processor, using the training data, the artificial intelligence model to generate the reports from the templates, and generate the respective narrative information describing reasons for inclusion or exclusion of various content in the reports.

15. The computer program product of claim 14, wherein the program instructions executable by the processor also cause the processor to:
prompt, by the processor, an entity for input information to determine at least one type of additional relevant sections of the report, additional relevant options of the report, or additional information to populate the report, if the processor cannot determine the input information on its own, wherein the processor has determined that the additional relevant sections, the additional relevant options, or the additional information cannot be inferred from the narrative information.

16. The computer program product of claim 14, wherein the defined factor further comprises at least one of a subject matter of the report, an audience for which the report is automatically generated, a filing need associated with the report, or a document associated with the report.

17. The computer program product of claim 14, wherein the filing need comprises a regulatory filing need, a governmental filing need, or an administrative filing need.

18. The computer program product of claim 14, wherein the program instructions executable by the processor also cause the processor to:
automatically generate, by the processor, the report based on a template selected from the templates, wherein the automatic generation is performed prior to the identification of the at least one of one or more types of relevant sections or one or more relevant options.

19. The computer program product of claim 14, wherein the processor determines the defined factor based on accessing known information by running an algorithm that executes a keyword or a key phrase search of documents and other types of information in the known information.

20. The computer program product of claim 14, wherein the program instructions executable by the processor also cause the processor to:
update, by the processor, based on at least the input information, the at least one of one or more types of relevant sections or one or more relevant options included in the report.

* * * * *